United States Patent [19]

Pershall et al.

[11] Patent Number: 4,574,225
[45] Date of Patent: Mar. 4, 1986

[54] APPARATUS FOR ACCOMMODATING INDUCTIVE FLYBACK IN PULSED MOTOR WINDINGS

[75] Inventors: Arthur A. Pershall, Machesney Park; George H. Holling, Roscoe, both of Ill.

[73] Assignee: Pacific Scientific Company, Anaheim, Calif.

[21] Appl. No.: 637,850

[22] Filed: Aug. 6, 1984

[51] Int. Cl.⁴ .............................................. H02P 6/02
[52] U.S. Cl. .................................... 318/254; 318/138; 318/345 C; 318/439; 318/696
[58] Field of Search .................... 318/138, 254, 254 A, 318/439, 685, 696, 345 R, 345 C, 345 CA, 345 AB, 345 B, 345 D, 345 G, 701

[56] References Cited

U.S. PATENT DOCUMENTS

| | | | |
|---|---|---|---|
| 3,909,690 | 9/1975 | Sugiura | 318/138 |
| 4,107,593 | 8/1978 | Anderson | 318/685 |
| 4,121,145 | 10/1978 | Talmadge | 318/696 |
| 4,242,624 | 12/1980 | Schalk et al. | 318/696 |

FOREIGN PATENT DOCUMENTS

| | | | |
|---|---|---|---|
| 57-16598 | 1/1982 | Japan | 318/254 |
| 57-78398 | 5/1982 | Japan | 318/696 |
| 57-80296 | 5/1982 | Japan | 318/254 |
| 57-162996 | 10/1982 | Japan | 318/696 |
| 57-162997 | 10/1982 | Japan | 318/696 |
| 58-36193 | 3/1983 | Japan | 318/254 |

Primary Examiner—William M. Shoop, Jr.
Assistant Examiner—Bentsu Ro
Attorney, Agent, or Firm—Leydig, Voit & Mayer, Ltd.

[57] ABSTRACT

Control circuits for operating electric motors of the class having windings pulsed in sequence and a magnetic field, the class being exemplified by brushless d.c. motors. Improved apparatus is provided for accommodating flyback action when excitation current through any one of the windings is interrupted by the opening of a switch device (e.g., on-off controlled transistor), whether that device be a sequence power switch or a main switch having a common series relation to all of the power switches and operated with an adjustable duty cycle so as to permit adjustment of motor speed and torque. The flyback apparatus, as here disclosed, provides low loss flyback current paths so as to return inductively stored energy back into the winding when its excitation is interrupted, thereby to enhance motor efficiency while eliminating high open circuit voltages across the switching devices. Negative torque which might be created in the flyback circuits as a result of back e.m.f. in a winding is precluded by threshold circuit elements or by timed control of the conductive and non-conductive states of the flyback current paths.

33 Claims, 10 Drawing Figures

APPARATUS FOR ACCOMMODATING INDUCTIVE FLYBACK IN PULSED MOTOR WINDINGS

BACKGROUND OF THE INVENTION

The present invention relates in general to electrical motors and in particular to motors in which windings are excited with time spaced energizing pulses. More particularly, the invention has to do with accommodation of inductive flyback energy when motor windings excited by current flow from a dc. voltage source are turned off by a series switching device.

Throughout this specification reference will be made to brushless dc. motors in which the magnetic field is created by permanent magnets on the rotor. The basic construction and operation of such motors is well known to those skilled in the art. It should be understood, however, that a straightforward equivalent of a permanent magnet rotor may be created by field windings carried on a permeable rotor and appropriately excited with current via slip rings to create the necessary magnetic field across the rotor-stator gap.

In electrical motors of the type wherein stator windings are pulsed by periodic closing and opening of switch means to draw current from a dc. voltage source, inductive "kick" or flyback action creates a reversed polarity voltage across a winding when the switch means opens and exciting current is interrupted. Unless appropriate accommodations are made, the flyback voltage may create breakdown damage to the switch means which are usually constituted by on-off controlled transistors. Moreover, unless flyback energy is dissipated or utilized within critical time spans, it may detract from useful output torque from the motor. Many flyback circuits heretofore employed in the prior art have added to the expense of a complete motor and its associated control apparatus and/or reduced the efficiency with which electrical energy from a power source is converted into mechanical energy.

OBJECTS AND ADVANTAGES OF THE INVENTION

It is the general aim of the invention to provide flyback accommodating apparatus in the control circuits for pulsed winding, permanent magnet field motors—such apparatus being characterized by lower cost and/or greater efficiency than has been achieved heretofore.

An important object of the invention is to provide a control circuit for a motor of the above-stated type which enables output torque and speed to be variably adjusted and controlled, and yet wherein the accommodation of the flyback energy is accomplished successfully with relatively few electrical components, at reasonably low cost, and/or with high efficiency in the conversion of electrical energy to mechanical energy.

In one aspect of the invention, it is an object to provide a single master switch in series with a parallel array of motor windings in series with their individual sequenced switches, with variable pulse width modulation (PWM) of the master switch during the "on" periods of each winding—so that average exciting current (and thus motor speed and torque) may be varied in a simple and effective manner; and in such an arrangement to accommodate flyback energy in all of the windings, due to opening of the master switch, in a very simple, low cost and efficient manner.

Still another object is to provide, in a motor controllable as to speed and torque by PWM action of a master switch, a flyback current path which is active when both the master switch and a sequence switch are open and which limits the open circuit voltage across both switches. This enables the switching devices, usually in the form of transistors, to be rated at lower open circuit voltages and to be procurable at lesser cost in contrast to the use of switching devices rated to withstand high flyback voltages.

From a different aspect, it is an object to provide a flyback accommodating circuit, in association with a winding in a pulse-excited, magnetic field motor, which does not appreciably dissipate energy built up in an excited winding, but instead converts a major portion of that energy into positive motor torque—and yet which prevents current flow through such winding due to back e.m.f. during its "off" intervals, thereby to avoid detraction from useful motor torque.

A further object of the invention is to realize (i) conservation of energy and (ii) avoidance of negative torque due to circulation of current as a result of back e.m.f. in a winding—by a flyback circuit which requires only a few components to trigger a flyback current path into a conductive state as a consequence of exciting current being interrupted—the path then reverting to a non-conductive state.

In this latter aspect, it is an object to provide a flyback circuit which in terms of electrical components is simple and low in cost, yet which involves such low loss of energy that many turn-offs per unit time may be handled without intolerable reduction in efficiency. This makes possible the practical control of torque and speed by PWM action during the "on" intervals of each winding.

BRIEF DESCRIPTION OF THE DRAWINGS

Other objects and advantges will become apparent as the detailed description proceeds with reference to the accompanying drawings, in which.

DETAILED DESCRIPTION OF PREFERRED EMBODIMENTS

Although the invention has been shown and will be described in some detail with reference to certain exemplary and preferred embodiments, there is no intention thereby to limit the invention to such detail. On the contrary, it is intended hereto cover all modifications, alternatives and equivalents which fall within the spirit and scope of the invention as defined in the appended claims.

Figure 1:
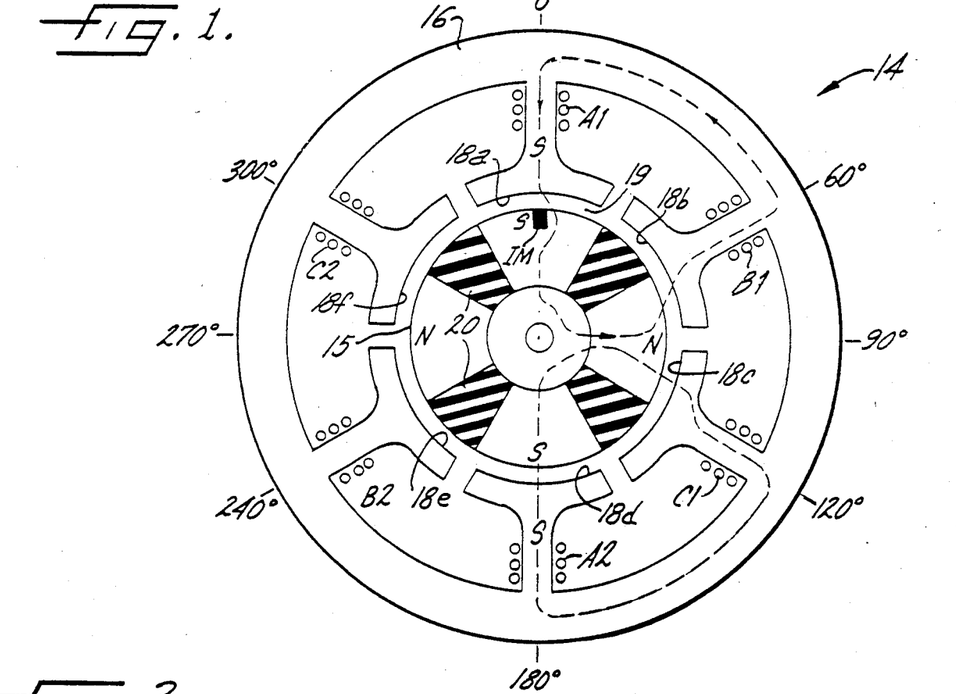
FIG. 1 is a diagrammatic cross-sectional illustration representative of the structural organization of a class of pulsed-winding, permanent magnet field motors, e.g., brushless d.c. motors.

The cross-sectional diagrammatic view in FIG. 1 is not intended to depict the actual construction of a commercially usable electric motor 14 but will serve to confirm the nature of the motor parts and certain angular relationships to which reference will be made for convenience in the course of the present description. The motor 14, illustrated merely as a typical example, is a three-phase dc. brushless motor with four poles and six stator slots representative of a class of motors well known to those skilled in the art. The motor includes a permanently magnetized four-pole rotor 15 journaled (by approriate shaft bearings, not shown) for rotation in a magnetically permeable stator 16 which carries three "phase" windings A, B, C respectively formed in two series portions A1, A2, B1, B2; and C1, C2 disposed on diametrically opposed stator pole pieces. It is assumed that during operation the rotor turns (and drives a load coupled to the rotor shaft) clockwise, so useful positive torque is in that direction; negative or undesirable torque would thus be counterclockwise.

The periphery of the cylindrical rotor is separated from six stator pole faces 18a through 18f by a very narrow annular air gap 19 across which magnetic flux may pass in "flowing" from a rotor north pole through the stator to a rotor south pole, thereby linking through the turns of the associated winding. Taking the stator pole faces 18a and 18d for purposes of discussion, current flow through the winding A (i.e., series portions A1, A2) in a given, forward direction tends electromagnetically to make those pole faces of south polarity so that (once the rotor has started moving clockwise) the two south poles of the rotor are repelled, and the two north poles of the rotor are attracted, thereby to create clockwise torque. The rotor is permanently magnetized (or carries permanent magnets fixed integrally thereon) to define four pole regions of sixty degrees at the periphery, as shown, with paramagnetic inserts 20 creating inactive segments of thirty degrees in extent.

For ready reference, the angular position of the rotor 15 relative to the stator 16 is designated by index mark IM on the rotor with respect to a 0° point here assumed to lie along the radial centerline of the pole face 18a. Thus, when the index mark is aligned with the centers of the pole faces 18b or 18c the rotor is said to be passing through 60° or 120° positions, and so on.

Figure 2:
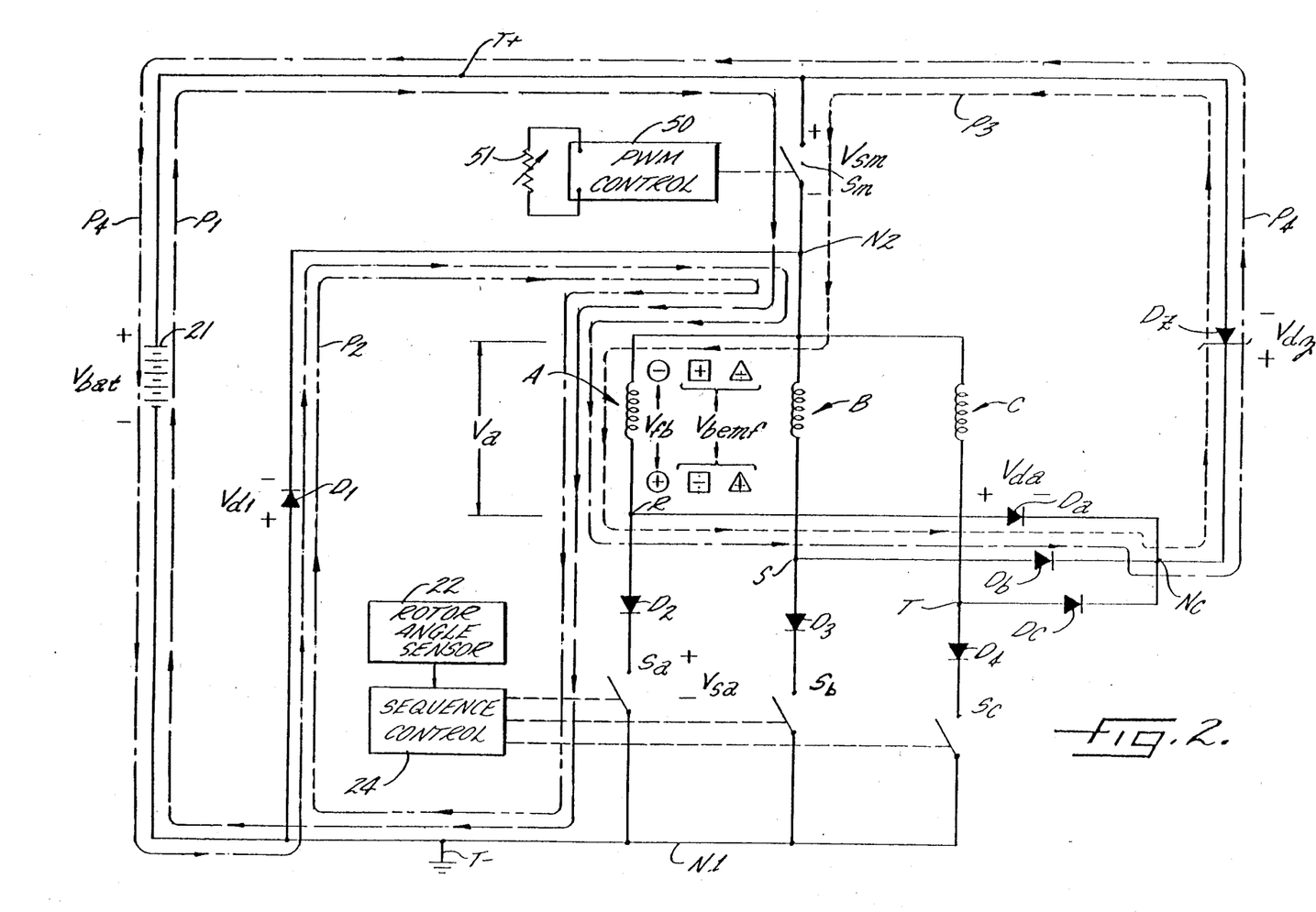
FIG. 2 is a schematic circuit diagram of a control circuit for the windings of the motor shown in FIG. 1, such circuit constituting a typical and preferred embodiment of the invention in one of its aspects.
Figure 3:
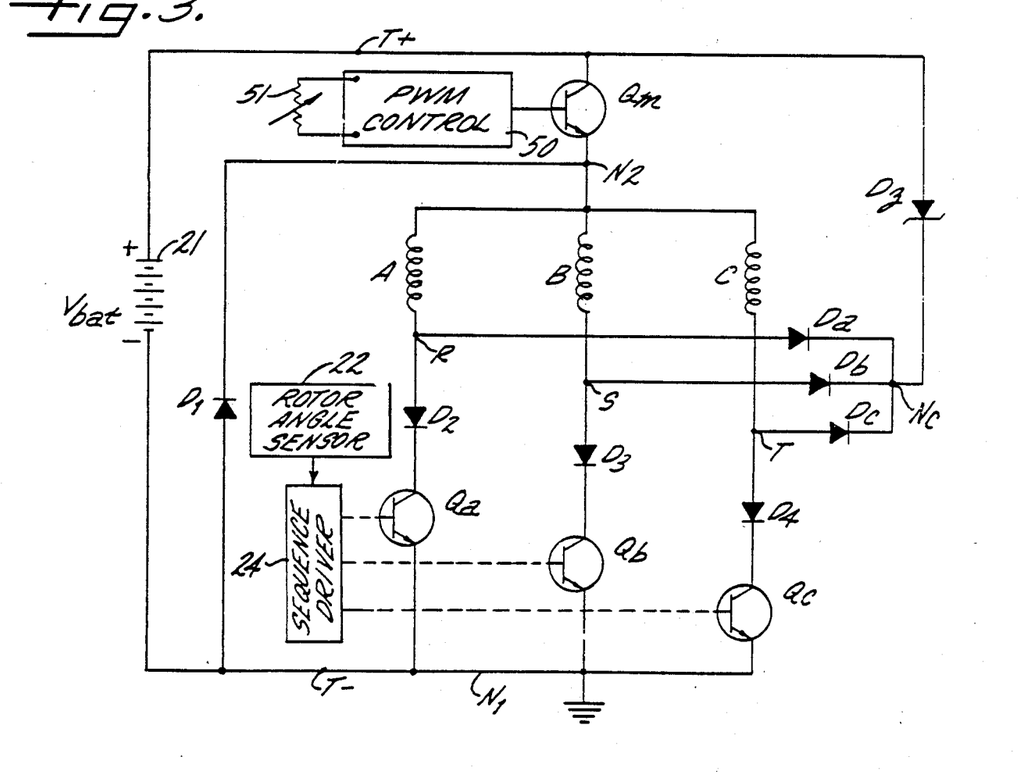
FIG. 3 corresponds to FIG. 2 but shows the switching devices in their most common commercial form as on-off controlled transistors.

To operate the motor 14, which is typical of a class of multipole permanent magnet field motors with pulsed windings, from a dc. voltage source, a control circuit such as illustrated in FIG. 2 is employed. Assume first that a main switch $S_m$ is omitted and replaced by a permanent connection between a node N2 and a terminal T+. A basic and well-known sequence control circuit is then constituted by a plurality of power switches $S_a$, $S_b$, $S_c$ respectively connected in series with the plural motor windings A, B, C (each having two distributed portions in series) to form plural series legs with series nodes R, S, T. Means in the form of conductors connect the plurality of series legs (here, three) in a parallel array between parallel nodes N1 and N2 which are adapted for connection to a suitable d.c. voltage and current source. In most instances the d.c. source will be any appropriate one of many known and commonly available power supplies, but that source is here shown conventionally as a battery 21 having its positive and negative terminals T+ and T− connected across the parallel array. The terminal T− and the node N1 are common and here shown as residing at a reference or ground potential. The switches $S_a$, $S_b$, $S_c$ are representative of on-off switching devices which preferably take the form of transistors $Q_a$, $Q_b$, $Q_c$ as shown in FIG. 3. In the manner well known to those skilled in the art, these switches are closed ("turned on") in staggered sequence as the rotor 15 turns through successive angular regions, so that each of the windings in succession is excited by current drawn from the d.c. voltage source 21. Although the timed "commutation" of the switches $S_a$, $S_b$, $S_c$ may be accomplished in various fashions well known in the art, FIGS. 2 and 3 illustrate in block form a rotor angle sensor 22 activating a sequence control circuit 24 which effects the sequential closing of the power switches. In one common form, the rotor angle sensor may be constituted by a Hall Effect device which responds to a disc carried on the rotor shaft and having magnetic and non-magnetic segments. As the rotor turns through successive sixty degree regions from its zero reference position, the signal from the Hall Effect device advances the sequence control 24 from the first to the second to the third of its three states in which it respectively drives the three switches to their closed or conductive conditions.

Figure 4:
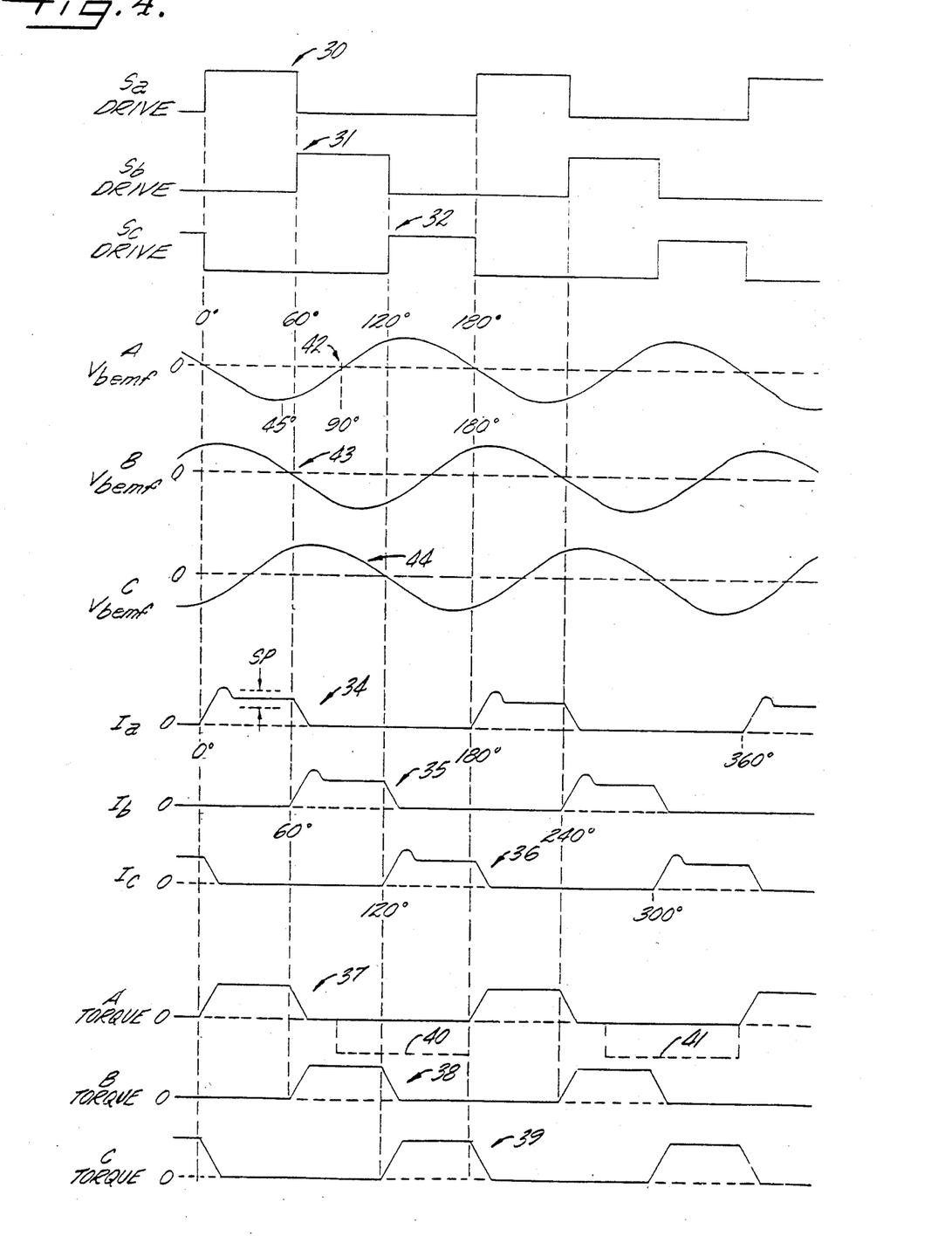
FIG. 4 is a series of waveforms illustrating variations in certain voltages, currents and torques plotted against rotor angle over a full revolution of the rotor.

Still assuming that the switch $S_m$ is replaced by a direct connection between N2 and T+, the operation of the motor 14 may be better understood from a brief consideration of the waveforms in FIG. 4, wherein the abscissae are labeled to represent the physical angular position of the rotating rotor. At any given rotational speed of the rotor, the horizontal axis for each waveform may also be viewed as a time scale. The square waves 30, 31, 32 represent the three "drive" signals supplied by the sequence control 24 to the switches $S_a$, $S_b$, $S_c$ (or the switching transistors $Q_a$, $Q_b$, $Q_c$) and thus depict the "on" times of those switching devices. It will be seen that the A winding is thus connected to the voltage source 21 as the rotor turns from 0° to 60° and 180° to 240° during each revolution; the B and C windings are similarly turned on but during staggered intervals and angular regions of the rotor's position. Because the control signals 30, 31, 32 are respectively offset in phase by one hundred twenty electrical degrees, the windings A, B, C in this type of d.c. motor are sometimes called "phase" windings; but this is not to be taken as implying that there are phase angles between sinusoidal voltages or currents as in the case of alternating current motors or transformers.

During the periods that each phase winding is turned "on" by its associated power switch, that winding is excited by current flow from the voltage source. The current path P1 through which winding A is excited, when switch $S_a$ is closed, is represented by dashed lines in FIG. 2. The current $I_a$ through winding A thus flows in pulses 34 which begin essentially simultaneously with the start of each $S_a$ drive pulse at 30 in FIG. 4. Each current pulse 34 has a slightly sloped leading edge due to the inductance of the winding, and tails off after each drive pulse ends (at 60° and 210° rotor position in FIG. 4) due to flyback action described below. The current pulses through winding B and C as shown at 35 and 36 are similar to the current pulses 34 but displaced by sixty degrees in relation to rotor position.

It will be understood, of course, that excitation of a given winding produces electromagnetic action which tends to make the two associated pole faces (FIG. 1) south poles and tends to make the radially outermost portion of the coil supports north poles. In consequence, each winding when energized produces a "pulse" of clockwise torque due to repulsion of rotor south poles and attraction of rotor north poles. The torque produced by each winding is illustrated in an idealized, non-rigorous fashion by the graphs at 37, 38, 39 in FIG. 4, with positive torque in this example being in a clockwise direction. Although torque from each individual winding appears as time-spaced pulses, the collective effect of all three windings is essentially a steady torque on the rotor because the torque pulses of all windings appear with little or no time spacing between them.

It is to be recognized, however, that current flow in the normal direction (from top to bottom in FIG. 2) through any winding may create negative torque on the rotor. If the A winding carries current when the rotor lies between the 90° and 180° position, the effect is to push a rotor south pole and attract a rotor north pole in a counterclockwise direction. Thus, rotor angle regions 40, 41 as labeled in FIG. 4 are those in which current through the A winding is desirably to be avoided because it would result in detraction from useful output torque then being produced by excitation of the winding B or the winding C. Similar "negative torque" regions of rotor positions exist for windings B and C but are offset by sixty degrees.

The phenomenon of inductive kick or flyback is well known. It is harmful mainly because opening a circuit to interrupt substantial current flow through a winding of appreciable inductance results in such a high negative rate of change of current through the winding that a very high voltage is induced in the winding with a polarity opposite to that originally applied to establish the current flow. The flyback voltage thus may cause breakdown and destruction of solid state switches such as transistors or arc-over of mechanical switches in relays or the like. The art has dealt with the inductive flyback problem by connecting flyback diodes, with or without series resistors, across windings in reluctance type step motors and electromagnetic brakes and clutches. Such expedients have also been employed for the pulsed windings of motors having magnetic fields, but a further problem arises in that case due to back e.m.f., as next to be explained.

The waveforms at 42, 43, 44 in FIG. 4 illustrate the back e.m.f. voltages induced in the windings A, B, C respectively when the permanent magnet rotor 15 is turning relative to the stator 16. As is known, back e.m.f. arises by generator action and the rate of change of flux coupling with a winding. The waveforms 42–44 are shown as sinusoidal in form but they may be trapezoidal or of other shapes depending upon how the permanent magnetism is distributed along the rotor's periphery in relation to the shaping of the stator pole faces. Of course, for a given strength (m.m.f.) of the rotor permanent magnetism and a given reluctance of the flux paths, the amplitude or peak value of the back e.m.f. voltage waveforms will be proportional to rotor speed. Essentially all motors are designed and rated for operation within a given range of speeds, and it is known that the largest amplitude of the back e.m.f. voltage will result when the motor is running at its specified top speed. The term "highest back e.m.f. value" will be used herein as denoting the amplitude or peak value of the alternating back e.m.f. voltage induced in a stator winding when the motor is operating at its highest intended or rated speed.

The polarity of each back e.m.f. voltage reverses as the rotor passes points separated by 90° in the exemplary motor shown in FIG. 1. As labeled in FIG. 2 and illustrated in FIG. 4 by waveform 42, the back e.m.f. voltage $V_{bemf}$ has the "negative" polarity represented by signs within small rectangles over 0° to 90° and 180° to 270° rotor angle regions; it has the "positive" polarity represented by signs within small triangles or the 90° to 180° and 270° to 360° rotor positions. The back e.m.f. of any given winding unavoidably alternates in polarity; it is called "negative" when having the polarity labeled within the small rectangles because it then tends to oppose or reduce current driven through winding A by the source 21 during "on" periods when that winding is connected to the source.

In the positive torque regions (from 0° to 90° and 180° to 270°) of rotor positions for the winding A, current flow produces positive torque. Since flyback current continues in the same direction as excitation current drawn from the d.c. voltage source, the winding A is usually turned off considerably prior to the rotor reaching the 90° or the 270° position (turn off in the example of FIGS. 1 and 4 occurs at 60° and 240°) so that flyback current falls off essentially to zero before a negative torque region is entered as the rotor passes the 90° or 270° positions. From FIG. 2, it may be seen that the flyback voltage $V_{fb}$ with the circled polarity signs has the same polarity as the "positive" back e.m.f. voltage $V_{bemf}$ labeled with small triangles. Because of this, if a flyback circuit is provided which freely passes current back into the winding after the power switch opens, then that same circuit will permit the "positive" back e.m.f. voltage to create current through the winding—and thus gives rise to negative torque during at least some portion of the intervals when the winding is "off". For this reason, it has been a known practice in conventional d.c. brushless motors with permanent magnet rotors to deal with inductive flyback by connecting the series combination of a diode and a Zener diode in parallel across each one of the motor windings. The diode is poled to conduct flyback current but to prevent current therethrough from the dc. source during "on" intervals for the winding. The Zener diode is connected to oppose flyback current but chosen to have a reverse conduction threshold voltage greater than the highest back e.m.f. value. In effect, the Zener diode creates a bias voltage which permits flyback current to flow when the flyback voltage $V_{fb}$ plus the back voltage $V_{bemf}$ (usually "negative") exceeds the Zener threshold, but which prevents current flow and negative torque when the back voltage $V_{bemf}$ is "positive" (i.e., with polarity signs labeled in small triangles). Yet, the Zener diodes consume or dissipate energy as watts equal to the product of current times voltage drop, and must be rated or heat sinked to dissipate the energy without destructive overheating.

In many applications of pulsed winding, magnetic field motors there is a need to vary the speed and torque over a reasonable range. It is possible to change or vary the angular extent of the "on" intervals of the three windings, but sequence controls to actuate the switches $S_a$, $S_b$, $S_c$ for variable angular intervals are both complex and expensive. Also, motor torque at low speeds then becomes less smooth and may exhibit perceptible pulsing because there would be appreciable intervals when all windings are off. In accordance with one feature of the present invention, the ability to vary or adjust motor torque and speed is provided by a single master switching device which is controlled to turn on and off with a relatively high frequency and with an adjustable duty cycle, thereby to vary the average current through each of the motor windings over the span of each winding's normal "on" time as established by its power switch.

Referring again to FIG. 2, means are provided to connect the parallel array of three series combinations (each comprising a winding and a power switch) in series with the main switch $S_m$ between first and second terminals T+ and T− of the d.c. voltage source 21. The main switch is "driven" by a PWM control 50 so that it opens and closes at a frequency greater than the frequency with which the power switches $S_{a\text{-}c}$ close at the rated top speed for the motor, and at an adjustable duty cycle (ratio of "on" time to the sum of "on" and "off" times) such that the closure of the main switch is pulse width modulated. The specific details of the PWM control 50 are known to those skilled in the art, and thus need not be illustrated here. It is sufficient to note simply that by adjustment of a rheostat or the like, the duty cycle of the switch $S_m$ may be adjusted to any desired value between 0% and 100%. The frequency of the PWM action is preferably chosen to have some selected value between 3 KHz and 20 KHz, but the only requirement is that it be greater than the switching frequency of the power transistors. In the typical motor of FIG. 1, if the maximum rated speed is 3600 r.p.m., the power switches are actuated at a frequency of 120 Hz; rarely will motors of this class have phase windings pulsed at a frequency greater than 400 or 500 Hz. One may appreciate, therefore, that the power switches $S_a$, $S_b$, $S_c$ when provided in the form of transistors $Q_a$, $Q_b$, $Q_c$ (FIG. 3) need be rated for only a relatively low maximum switching frequency, and only one higher cost transistor ($Q_m$ in FIG. 3) with a high frequency switching rating need be procured.

When the winding A is "on" because its power switch $S_a$ is closed, it will nevertheless be turned on and off at a high rate, and at an adjusted duty cycle, as the master switch $S_m$ closes and opens. The winding A with its inductance acts somewhat as a smoothing filter, however, so that the average current through the winding (and thus the average torque which it contributes to the rotor) will be generally proportional to the adjusted duty cycle for the main switch $S_m$. In FIG. 4, the dashed lines at SP generally depict a span or range of average current values which may be created by increasing or decreasing the duty cycle of the switch $S_m$ as a result of adjusting the rheostat 51 in FIG. 2.

As thus far described, the arrangement of FIG. 2 which achieves adjustability in motor speed and torque through adjustment of the duty cycle with which a master switch is actuated, leaves unresolved the need to deal with inductive flyback and to avoid excessive high open circuit voltages across both the power switches $S_a$, $S_b$, $S_c$ and the master switch. Each winding A, B, C will produce a flyback action both (a) when its power switch and the switch $S_m$ both have been closed but the switch $S_m$ then opens—and this will occur at a relatively high frequency separated by relatively short intervals, and (b) when both its power switch and the switch $S_m$ both are closed but the power switch then opens. Since the pulsed action of the master switch is not synchronized to the pulsed action of the power switch, case (b) may or may not happen each time the power switch opens; but in any event the flyback case (b) will occur with considerable less frequency than flyback case (a). A third flyback case (c) may also occur, namely, when both the power switch and the master switch have been closed but then one of such switches opens to start flyback action of case (a) or (b), followed by opening of the other switch before flyback current has fallen to zero. That is, case (c) occurs when both the power switch and the master switch are both open at a time when a winding still has inductively stored energy due to previously flowing excitation current. In this third case (c), the remaining energy stored inductively in the winding must be either converted to mechanical energy or dissipated so as to prevent destruction of a switching device.

In accordance with the present invention, flyback action is accommodated, and inductively stored energy is converted back into useful torque and mechanical output from the motor, when both the main switch $S_m$ and any one of the plural power switches have both been closed, but the main switch then opens—and by a single, simple, low cost component which is shared by and effective with respect to all of the motor windings. As here shown in FIG. 2, means are connected into the control circuit to establish a unidirectionally conductive path in parallel across the parallel array of series circuits, the unidirectional orientation being such that flyback current may flow back into any given winding when its power switch is closed at a time that the main switch opens. Such means preferably take the form of one or more circuit elements which create little opposition to flow of flyback current and are here shown as a solid state diode D1 connected directly between nodes N1 and N2 and poled to conduct current from the latter toward the former.

Figure 5:
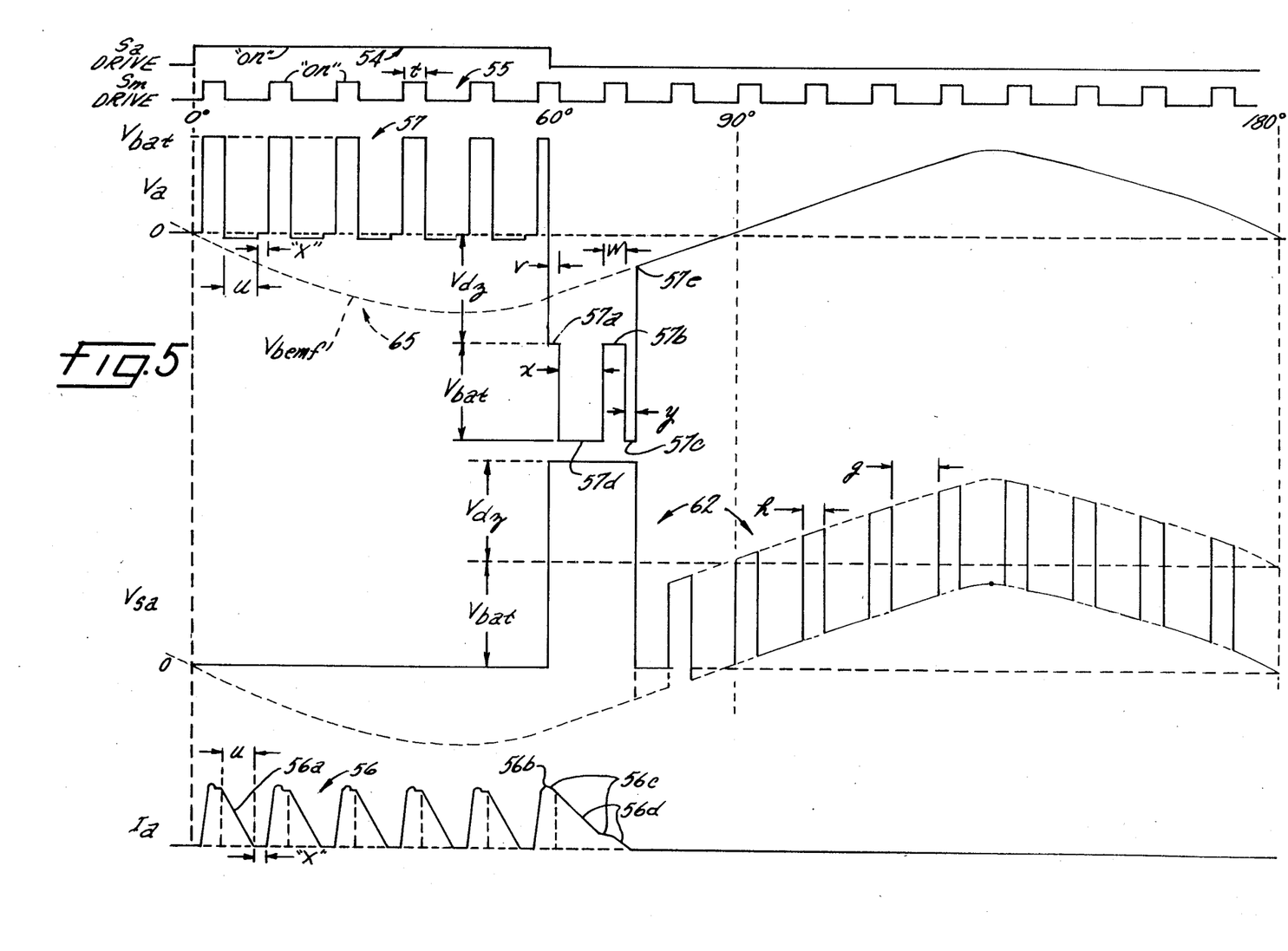
FIG. 5 is an enlarged graphical illustration of variations in certain signals, plotted against rotor angle, associated with one phase winding.

Consider now that the power switch $S_a$ is closed or "on" as the rotor turns between 0° and 60° positions, as represented by the graph 54 in FIG. 5. Over this time span, the PWM control 50 actuates or turns the switch $S_m$ "on" several times, each "on" interval being for a time span t, as illustrated by the graph 55. The width of the span t is determined by setting of the rheostat 51 which establishes the duty cycle of the switch $S_m$. During each interval t, when switches $S_a$ and $S_m$ are both closed, the d.c. voltage source is connected across the winding A and the voltage $V_a$ (waveform 57 in FIG. 5) across that winding is essentially equal to the source voltage $V_{bat}$—so that exciting current is driven via the path P1 through the winding. The current $I_a$ rises to form a current pulse as shown by the current waveform 56 in FIG. 5. At the end of each interval t, however, when the switch $S_m$ opens, a flyback voltage $V_{fb}$ is induced, with the polarity labeled in FIG. 2, in the winding A. This voltage is clamped to the forward drop (about 0.7 volts) across the diode D1 which conducts flyback current along the path P2 through the winding A and the now-closed switch $S_a$. The winding voltage $V_a$ as shown at 57 becomes slightly negative so long as flyback current flows in the periods u. Very little energy is converted to heat in the diode D1 because the forward voltage drop across that diode is very small. The flyback current in path P2 thus acts electromagnetically within winding A to create positive torque on the rotor, and the energy which was inductively stored in the winding is converted into useful mechanical output from the motor. As the stored energy decreases, the current falls, as shown at 56a in FIG. 5, until it reaches zero. It is not necessary, however, that the current fall to zero before the next turn on interval t begins and excitation current is again drawn from the source 21.

It is to be noted that during the flyback intervals u, the voltage across the open switch $S_m$ is essentially equal to the source voltage $V_{bat}$, so that switch if embodied as a transistor need not be rated to withstand an extremely high open circuit collector voltage. It may be seen, also, that the diode D1 functions in precisely the same manner in cooperation with windings B and C whenever their associated sequence switches $S_b$ and $S_c$ are "on" and the switch $S_m$ opens. Because this type (called case (a) above) of flyback action occurs at such a high rate (e.g. 5 KHz), simply dissipating the flyback energy would involve relatively high wattage losses and significantly decrease motor efficiency. But the single diode D1 shared in common by all three windings acts to return flyback energy into useful motor output torque—and thus overcomes the flyback problem very simply, at low cost, and without wasting energy.

In accordance with another feature of the present invention, provision is made to accommodate flyback action—when both the main switch $S_m$ and a power switch have been closed but the power switch then opens (case b)—and in a fashion which avoids negative torque due to back e.m.f. For this purpose, means are provided to create a unidirectionally conductive path between each of the series nodes (R, S, T) and the first terminal (T+). Each path is, in effect, in parallel with a respective one of the windings and the main switch. Each such path is able to conduct only when the voltage across the associated winding is of a polarity corresponding to flyback action (see circled polarity symbols in FIG. 2). Moreover, each such path is formed with means to prevent current flow unless and until the winding voltage with such polarity exceeds a predetermined magnitude which is chosen to be greater than the highest back e.m.f. value in a winding, thereby to preclude negative torque arising from the presence of the flyback current during those times that the associated power switch is open.

With reference to FIG. 2, it may be seen that the last-specified means to create a unidirectionally conductive path associated with each winding is preferably embodied by a few simple and inexpensive circuit components. In the preferred form, solid state diodes $D_a$, $D_b$, $D_c$ are connected and poled to conduct forward current away from the respective series nodes R, S, T to a common node $N_c$. Connection is made from the latter node through a single reversely poled Zener diode $D_z$ to the first terminal T+. Thus, when switch $S_m$ is closed but the switch $S_a$ has just opened, flyback current flows around the closed path labeled P3 as a consequence of the voltage $V_{fb}$, taken algebraically with the voltage $V_{bemf}$, providing that the net or sum of those voltages exceeds the breakdown threshold of the diode $D_z$. Flyback current similarly flows through diode $D_b$ or $D_c$ and the common Zener diode $D_z$ when switch $S_m$ is closed but power switch $S_b$ or $S_c$ opens.

The Zener diode $D_z$ is a well known and conveniently usable form of what is here generically called a "threshold breakdown device". The unidirectional nature of the Zener diode $D_z$ is not important, and it may in theory at least be replaced by other known forms of threshold breakdown devices which are non-conductive until the voltage thereacross exceeds a certain threshold value, but which then conduct with the threshold value of voltage drop regardless of the magnitude of the current. For example, a neon gas ionization tube (diode) has this characteristic and may be substituted for the Zener diode $D_z$. It will be seen that in any specific form, the threshold breakdown device acts to create, in effect, a bias voltage which is opposite in polarity to the flyback voltage $V_{fb}$ in any of the windings and which therefore opposes the flow of flyback current.

The breakdown threshold of the Zener is chosen to be at least as great as the highest back e.m.f. value induced in a winding. As a result, no current can flow in the flyback path P3 due to "positive" back e.m.f. in a winding during the "off" intervals of its power switch despite the fact that the master switch is periodically closed during such intervals. Thus, the flyback path created by diodes $D_{a-c}$ and Zener $D_z$ precludes undesirable negative torque which would detract from useful output from the motor.

The case (b) flyback operation associated with winding A is better understood with reference to FIG. 5. Case (b), with the switch $S_m$ closed but the switch $S_a$ open, exists during the intervals labeled v and w in FIG. 5 when flyback current is flowing around path P3 in FIG. 2. In these circumstances, and as shown at 57a and 57b on the waveform 57, the voltage $V_a$ across winding A is clamped by diode $D_z$ to the constant reverse breakdown voltage $V_{dz}$ of the Zener diode (ignoring the small forward voltage drop $V_{da}$ across $D_a$). The polarity of the voltage $V_a$ at 57a and 57b is negative in the sense that it has the polarity represented by the circled signs in FIG. 2. The open circuit voltage $V_{sa}$ across the switch $S_a$, as represented by graph 62, is thereby limited in magnitude to the sum of the voltage $V_{bat}$ and the winding voltage $V_a$ during the intervals v and w; but since $V_a$ is approximately equal to $V_{dz}$, the open circuit voltage across switch $S_a$ is limited essentially in magnitude to sum of $V_{bat} + V_{dz}$. This is a modest open circuit voltage which can be tolerated by relatively inexpensive transistors chosen to constitute the switches $S_{a-c}$ and to perform the sequence switching function at relatively low frequencies on the order of 120 Hz. During the intervals v and w, the winding current $I_a$ falls with a relatively small slope 56c; such current contributes to positive torque from the motor; but such current also results in instantaneous wattage (equal to $I_a \cdot V_{dz}$) which is dissipated as heat in the Zener diode $D_z$. The long term average of watts converted to heat in the Zener diode is much lower than instantaneous wattage values because the Zener diode conducts current essentially in pulses at three times the frequency with which a power switch is closed. The common Zener diode $D_z$, rated or heat sinked to dissipate heat due to case (b) flyback current for all three windings, is less expensive than would be three individual Zener diodes individually connected in series with $D_a$, $D_b$, $D_c$ to the terminal T+ and rated or heat sinked to tolerate one-third as much long term average wattage. It is to be noted further that the common Zener diode $D_z$ which is active for case (b) flyback action is not involved in case (a) flyback action——and thus that Zener diode need not be rated or heat sinked to withstand any energy converted into heat as a result of case (a) flyback.

In FIG. 5, the third case (c) obtains during intervals x and Y—when inductive flyback energy still remains in the winding A but both of the switches $S_m$ and $S_a$ are open. In such circumstances, the algebraic net sum of the flyback voltage $V_{fb}$ and the back voltage $V_{bemf}$ tends to drive flyback current around the path labeled P4 in FIG. 2, that is, reversely through the Zener $D_z$ and the source 21 and forwardly through diodes $D_a$ and D1. The Zener diode, however, permits any magnitude of reverse current flow at a constant voltage $V_{dz}$ and therefore clamps the winding voltage $V_a$ to a magnitude essentially equal to $V_{bat}+V_{dz}$ as indicated at graph portions 57c and 57d (ignoring the small forward voltage drops $V_{da}$ and $V_{d1}$).

One may see from FIG. 2 that when case (c) is taking place, the open circuit voltage across the master switch $S_m$ is equal to $V_{bat}-V_{d1}$, that is, essentially equal to the voltage of the source 21. The master switch, when constituted by a switching transistor thus need not be rated to withstand a high open circuit voltage. Also, it is evident from FIG. 2 that during case (c) conditions, the voltage across the power switch $S_a$ is equal to $V_{da}+V_{dz}+V_{bat}$. The forward diode drop $V_{da}$ is very small and negligible, so the open circuit voltage $V_{sa}$ across the switch $S_a$ is limited, in effect, to $V_{bat}+V_{dz}$, as confirmed by the waveform 62 during the intervals x and y. Again, no inordinate expense is associated with obtaining power sequence transistors rated to withstand such modest open circuit voltage (and rated to handle modest switching frequencies on the order of 120 Hz.).

During case (c) flyback, the flyback current does not flow through the winding A. Rather, some of the energy inductively stored in the winding is returned to the source 21, and some is dissipated as heat in the Zener diode $D_z$. Yet case (c) can arise only randomly—when both the switches $S_m$ and $S_a$ happen to be open at a time when energy still remains inductively stored in the winding A. Case (c) is not grossly inefficient, and it does not occur repetitively and regularly at a high rate, as does case (a). In any event, the flyback current during the intervals x and y falls with a relatively steep slope as illustrated at 56d on waveform 56 and it cuts off to zero value when the inductively stored energy has been reduced to the point that the voltage $V_a$ is no longer sufficient to sustain current flow against the opposition of the Zener threshold voltage plus the source voltage $V_{bat}$. When this point is reached the winding voltage $V_a$ becomes equal to the back voltage $V_{bemf}$, as indicated at 57e in FIG. 5; and the open circuit voltage across both of the switches $S_m$ and $S_a$ reverts to zero because diodes $D_z$ and D1 are no longer in a conductive state.

As the rotor turns beyond point 57e to the 90° position and beyond, the switch $S_a$ is steadily off (as shown in FIG. 5). The winding A no longer contains inductively stored energy. The switch $S_m$ continues to close periodically and to cooperate in the excitation of the winding B or the winding C. During intervals g when the switch $S_m$ is open, the open circuit voltage $V_{sa}$ (waveform 62) across switch $S_a$ is equal to the voltage $V_a$ which in turn is equal to the back voltage $V_{bemf}$ represented by the graph 65 superimposed on the waveform 57 in FIG. 5. During intervals h when the switch $S_m$ is closed, that open circuit voltage $V_{sa}$ is equal to the sum of the $V_{bat}$ and $V_{bemf}$. Thus, over the span of its sequenced "off" periods (rotor angle 90° to 180°) the sequence switch $S_a$ is subjected to a changing open circuit voltage as shown in FIG. 5, but never of a magnitude which exceeds the highest back e.m.f. value plus the source voltage $V_{bat}$. This latter sum is less than $V_{dz}+V_{bat}$ experienced by the switch $S_a$ during intervals v, w, x and y, so no problem of breakdown of the switch $S_a$ arises.

The relationships shown by FIG. 5 for the winding A and its sequence switch $S_a$ apply equally well to the windings B and C and their sequence switches $S_b$ and $S_c$. The timing is shifted with respect to the rotor angle, so a merely repetitive graphical illustration of voltages across windings B and C and their switches $S_b$ and $S_c$ is unnecessary.

FIG. 3 is a straightforward counterpart of FIG. 2 except that the switches $S_m$, $S_a$, $S_b$, $S_c$ are shown in their preferred practical form as switching transistors $Q_m$, $Q_a$, $Q_b$, $Q_c$ which are turned "on" or "off" by drive signals applied to the base-emitter junctions. It is to be understood that the term "switch" as used herein is to be taken in its most generic sense as embracing either a solid state controlled switch device or a controlled mechanical switch such as relay contacts—assuming that controlled mechanical switches could be made effectively to operate at the desired switching speeds.

When power sequence transistors $Q_a$, $Q_b$, $Q_c$ are employed as shown in FIG. 3, it can happen that their collector-base junctions (always reversely biased in normal transistor operation) become forwardly biased to some small voltage magnitude. This may occur with respect to the transistor $Q_a$, for example, when it is in the "off" state, the switches $Q_m$ and $Q_b$ have both been closed to send excitation current through the winding B, and the switch $Q_m$ then opens as an incident to its PWM action. In these circumstances, the shared diode D1 conducts flyback current from winding B back into the winding B, and the forward voltage drop (about 0.7 volts) $V_{d1}$ across diode D1 makes the node N2 reside at about $-0.7$ volts in potential relative to the reference or ground terminal T−. If at this instant the back e.m.f. $V_{bemf}$ in winding A is essentially zero or not positive and greater than 0.7 volts, then the series node R will become negative relative to ground and the collector junction of transistor $Q_a$ will be forwardly biased. To avoid this possibility, because some types of transistors are injured or destroyed by a forward collector bias, a diode D2 is interposed between the series node R and the collector of $Q_a$ and poled to conduct normal A winding excitation current. The diode does not interfere with the operation previously described but it does act as an open circuit when node N2 swings negative relative to ground. In this way, the diode D2 precludes a potentially harmful forward bias on the collector of the sequence transistor $Q_a$. The illustrated diodes D3 and D4 serve the same protective function in relation to the transistors $Q_b$ and $Q_c$.

Figure 6:
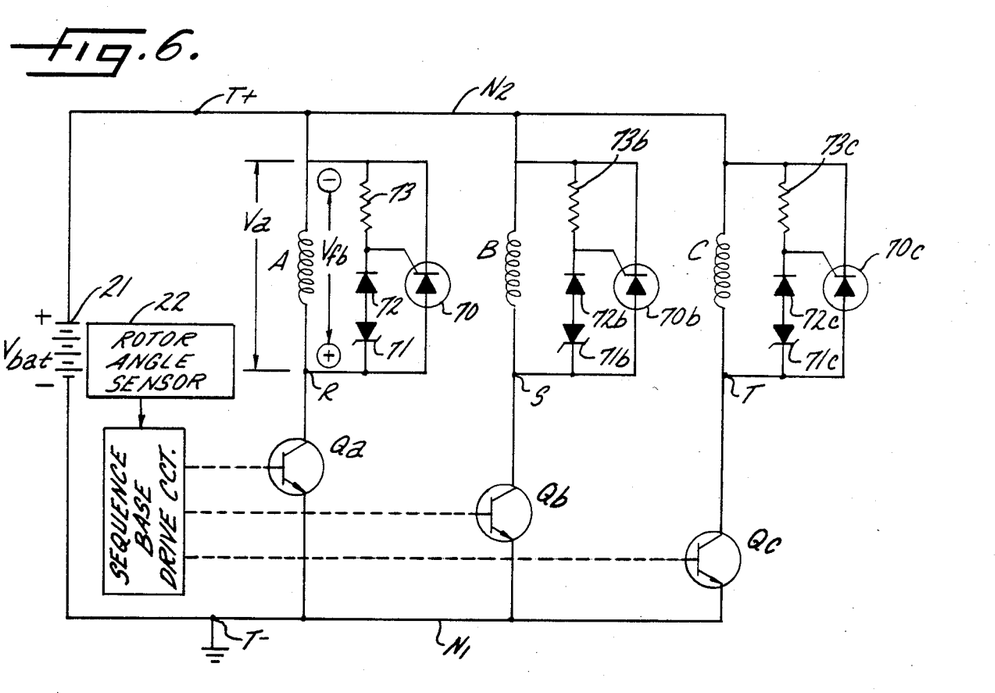
FIG. 6 is a schematic circuit diagram of a control circuit for the windings of a brushless dc. motor, such circuit showing a typical and preferred embodiment of the invention in another of its aspects.

FIG. 6 shows a control circuit for a pulsed winding, permanent magnet field motor (and specifically the motor 14 of FIG. 1, as an example) wherein no master switch is utilized and motor speed and torque cannot be adjustably varied by PWM action in the manner described with reference to FIGS. 2–5. Except for the flyback accommodating circuits in parallel across each of the windings A, B, C and hereafter to be described in detail, the control circuit in FIG. 6 is conventional. It includes the plural motor windings A, B, C each in a series leg with an associated sequence transistor $Q_a$, $Q_b$, $Q_c$—there being series nodes R, S, T. The plural series legs are associated in a parallel array between parallel nodes N2 and N1 which are common to first and second terminals T− and T+ connected to a suitable d.c. voltage source 21. A rotor angle sensor 22 supplies stimulating signals to a sequence control or base drive circuit 24 which sequentially turns on the transistors $Q_a$, $Q_b$, $Q_c$ as the motor rotor turns through successive sixty degree regions of its angular positions.

As explained earlier herein, if a flyback circuit in parallel with a motor winding is permitted to conduct current as a result of positive back e.m.f. voltage when the associated sequence switch is in its "off" state (i.e., during rotor angle positions of 60° to 180° and 240° to 360° in FIG. 4 if winding A is being considered), then such current flow creates negative torque and detracts from useful output of the motor. The prior art has overcome this problem by connecting a reversely poled Zener diode in series with a conventional diode across each motor winding, with the conventional diode poled to prevent current flow when the voltage across the winding is opposite in polarity to the flyback voltage. The Zener diode prevents current flow due to back e.m.f. of a "positive" polarity because its reverse breakdown threshold is chosen to be at least slightly greater than the highest back e.m.f. value. This comes, however, at the expense of the Zener conducting flyback current with a significant voltage drop, so that a considerable proportion of flyback energy is dissipated as heat in the Zener diode rather than being returned to the winding and contributing to positive motor torque and useful output.

In accordance with a second aspect of the present invention, that last-stated disadvantage is overcome, and yet negative torque due to positive back e.m.f. is avoided, by a novel although simple flyback accommodating circuit associated with each motor winding. In general terms, the new flyback circuit comprises three major components now to be described.

First, there are provided means constituting a normally non-conductive current flow path in parallel with the winding, such means including an element which, when enabled, makes the path conductive with substantially negligible opposition (whether as an opposing voltage or as a resistance) to current flow. Any one of several available electrical devices which meet this requirement may be chosen for that circuit "element". For example, a TRIAC, thyratron, ignitron, silicon controlled rectifier (SCR) or other members of that genus will serve the purpose. Such devices are characterized as being non-conductive until stimulated or triggered into a conductive state by some triggering signal, after which they conduct current with little resistance or voltage drop. In the specific and exemplary embodiment of FIG. 6 the first circuit means associated with the winding A is constituted by a single element in the form of an SCR 70 connected directly in parallel with that winding. Although the SCR, when once triggered or fired, can only conduct current flow from its anode to its cathode, this unidirectional characteristic is neither a requisite nor a disadvantage.

Second, means are provided which are responsive to the voltage across the winding for setting or triggering the element into its conductive state when that voltage (i) is of the polarity created by inductive flyback action and (ii) exceeds a predetermined threshold magnitude. Again, any one of several available electrical components, or a combination of components, may be chosen to meet these stated criteria. For example, an operational amplifier connected as a comparator—and receiving on one (subtractive) input a reference voltage but on the other (additive) input the voltage across the winding—may be connected via a differentiator to supply a triggering pulse to the element when the winding voltage is opposite in polarity to, and exceeds the magnitude of, the reference voltage. Preferably, however, the second means includes a threshold breakdown device, exemplified by the well-known Zener diode, but connected in series with a conventional diode which prevents current through the breakdown device unless the winding voltage has flyback action polarity. As shown by way of preferred example in FIG. 6 in association with winding A, the second means is constituted quite simply by the series combination of a Zener diode 71, a conventional diode 72 and a resistor 73 connected directly across that winding—and with the resistor extremities coupled to the cathode and gate of the SCR 70. The diode 72 prevents current flow through this series path when the switch $Q_a$ is closed and thus prevents shunting of excitation current around the winding A. The Zener diode 71 prevents current flow through the resistor 73 until the voltage $V_a$ exceeds the Zener threshold. When this occurs, however, the voltage drop across the resistor 73 forms a triggering voltage pulse applied to the gate of the SCR 70 so the latter "fires".

Third, means are provided for restoring the normally non-conductive element, after it has been triggered into its conductive state, to the non-conductive state when flyback current flow has fallen to a predetermined low value. When an SCR 70 in FIG. 6 is utilized as the element in the first path means, it has the known characteristic that its anode-cathode path cuts off automatically whenever anode current falls to zero. Thus, the third means here specified is included within and constituted by the circuit element of the first path when that element is an SCR 70 or the like. In some instances, however, that first path circuit element may be of a character analogous to a mechanical switch which is affirmatively actuated (triggered) into a conductive state and must be affirmatively actuated to make it return to the non-conductive state. In the latter case, the third means is not included within the first means but may be arranged to sense the winding voltage or current and to disable the circuit element of the first means.

The flyback circuits for windings B and C in FIG. 6 are identical to that described for the winding A, and the corresponding components are labeled with the same reference characters but with the distinguishing suffixes "b" and "c".

Figure 7:
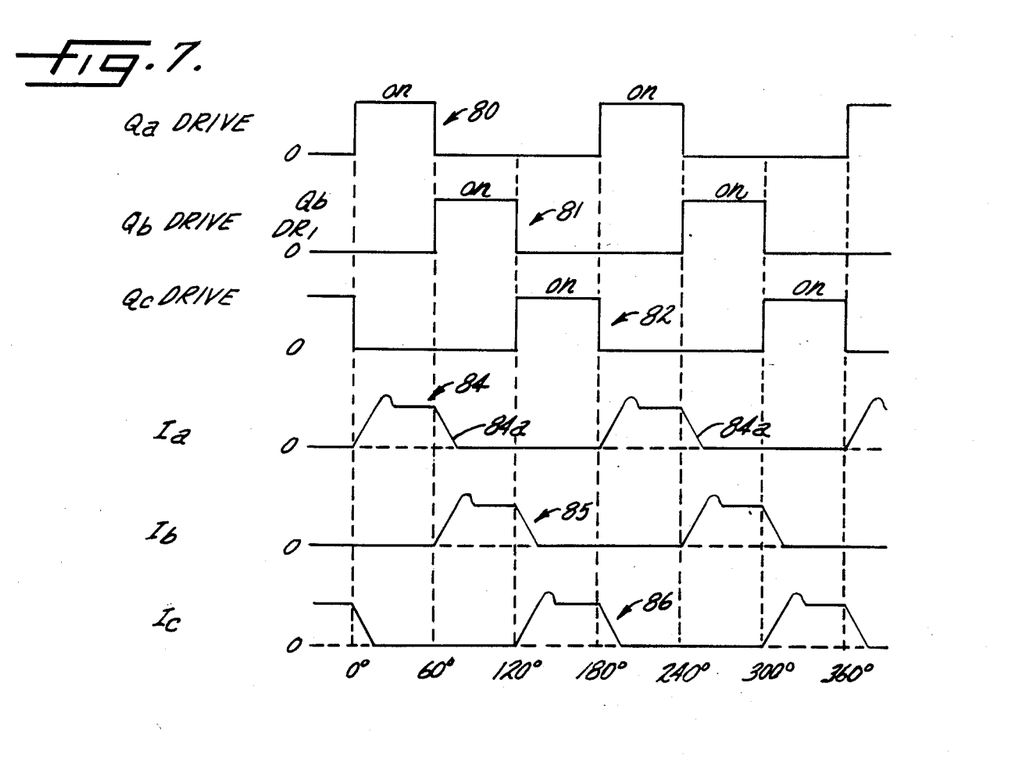
FIG. 7 is a graphical illustration, plotted against rotor angle over one revolution, of the base drive signals and the winding currents during operation of the circuit shown in FIG. 6.

FIG. 7 illustrates sequence base drive signals and the winding current pulses plotted against rotor angle when the FIG. 6 circuit is in operation. The base drive signals appear at 80, 81, 82 to show the respective, sequentially staggered "on" times of the respective transistors $Q_a$, $Q_b$, $Q_c$. The three current pulse waveforms 84, 85, 86 illustrate the currents $I_a$, $I_b$, $I_c$ which flow through the respective windings A, B, C. It is to be noted that after each sequence "on" interval sixty degrees wide, flyback current continues to flow in the turned-off winding, but tails off with a negative slope, as shown at 84a.

Figure 8:
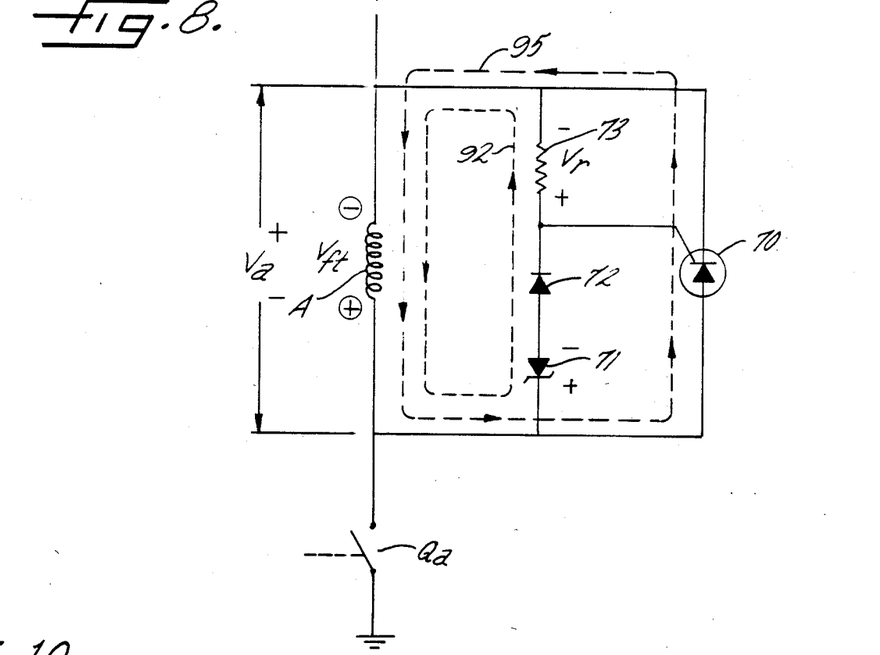
FIG. 8 is an enlarged schematic diagram of the flyback-accommodating circuitry associated with one of the three windings appearing in FIG. 6.
Figure 9:
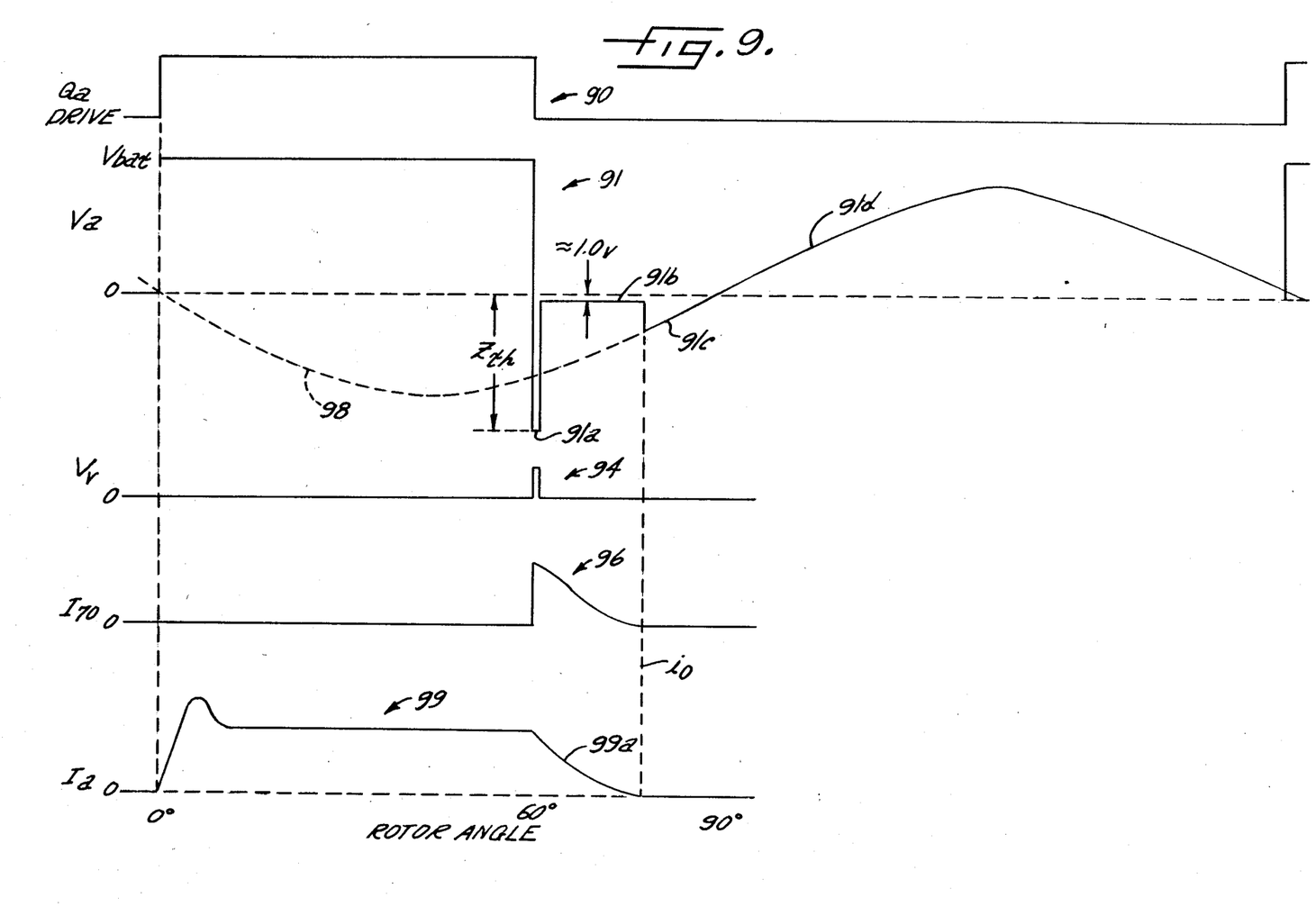
FIG. 9 is an enlarged waveform illustration of certain variables, plotted against rotor angle, involved in the operation of the circuitry of FIG. 8.

The operation of the flyback circuit associated wih a winding (here, by example, winding A) may be better understood through consideration of the enlarged schematic in FIG. 8 and the graphical illustration in FIG. 9. In the latter figure, the $Q_a$ base drive signal is represented at 90, indicating that the winding is turned "on" over a rotor angle span of sixty degrees. During that span, the winding voltage $V_a$, graphically depicted at 91, is positive and essentially equal to the source voltage $V_{bat}$. Thus, it is apparent from FIG. 8 that during such span, the first flyback circuit path means carries no current because the SCR 70 has not been enabled. Also, the series combination 71, 72, 73 carries no current because the conventional diode 72 is reversely biased by the voltage $V_a$ and thus cut off. That diode 72 in the present example serves the function of permitting triggering or setting action on the SCR 70 only when the winding voltage $V_a$ is of flyback polarity (represented by circled symbols); but that diode also precludes forward conduction through the Zener 71 and shunting of current around the winding A when the sequence switch $Q_a$ is closed.

Immediately after the instant that the rotor passes the 60° position, the flyback voltage $V_{fb}$ tends to become very large and with the polarity shown in FIG. 8. The voltage $V_a$ thus swings negative at 91a in FIG. 9 but it is clamped by reverse conduction (current path 92 in FIG. 8) through the Zener 71 because the latter's breakdown threshold is reached. The current in path 92 immediately produces a voltage drop $V_r$ across the resistor 73 (as depicted at 94 in FIG. 9) and this voltage coupled between the cathode and gate of the SCR 70 almost immediately triggers the latter into its conductive state. Two effects result from this. First, the SCR 70 conducts forward current with a very low anode-cathode drop, so the threshold voltage across Zener 71 is not maintained and the current in path 92 ceases. In effect, the triggered element 70 shunts and disables the triggering means. Second, flyback current flows in the path labeled 95, with little opposition by the enabled SCR 70 due to the latter's low forward anode-cathode drop. Thus, inductively stored energy is not appreciably dissipated in the SCR 70 (nor in the triggering path 71, 72, 73) and circulation of flyback current back into the winding A contributes to positive motor torque. Efficiency of the motor is enhanced because stored flyback energy is primarily converted back into motor mechanical output energy.

Because of the action of the SCR 70 in "shunting" the triggering means 71, 72, 73 so that Zener 71 becomes non-conductive, the voltage $V_r$ exists only as a very short pulse shown at 94 in FIG. 9. Certainly, the Zener diode need have only a very low wattage rating since it conducts only very short and low magnitude current pulses. The negative excursion 91a of the voltage $V_a$ is in nature likewise a short pulse; as soon as the SCR 70 fires, the voltage $V_a$ is clamped to the anode-cathode forward drop (about 1.0 volts) as indicated at 91b. Following the $V_r$ voltage pulse, the flyback current through the SCR (here called $I_{70}$) continues to flow in the path 95 as appears graphically at 96 in FIG. 9. As the stored inductive energy decreases, this current falls off more or less exponentially and reaches zero at the time instant $i_o$. In consequence, the SCR restores automatically to its non-conductive state. When this occurs the voltage $V_{fb}$ is essentially zero, and the voltage $V_a$ is no longer clamped to the forward drop of the SCR. The voltage $V_a$ (which unless clamped would be equal to the algebraic sum of the back e.m.f. and $V_{fb}$) now becomes equal to $V_{bemf}$ because $V_{fb}$ is zero, as shown at 91c on waveform 91. The back e.m.f. voltage is illustrated at 98 in FIG. 9, and the voltage $V_a$ follows $V_{bemf}$ from instant $i_o$ until the next turn-on of $Q_a$ occurs.

The current waveform $I_a$ at 99 in FIG. 9 thus involves excitation current affirmatively driven by the source 21 through winding A during the rotor position span of 0° to 60°; thereafter until instant $i_o$ the current $I_a$ continues due to flyback action and gradually falls off, as indicated at 99a, to reach zero at the instant $i_o$. The instant $i_o$ is reached before the rotor arrives at the 90° position and before the back e.m.f. voltage becomes positive; thus, no negative torque results from flyback current, but a positive torque contribution is obtained.

As the rotor turns from 90° to 180° and the sequence switch $Q_a$ is "off", the voltage $V_a$ is constituted by positive back e.m.f. as represented at 91d. This voltage cannot create current in winding A because the two parallel paths (70 and 71, 72, 73) of the flyback circuitry are both non-conductive. Because the breakdown threshold of the Zener diode 71 is chosen to be at least slightly greater than the highest back e.m.f. value, the series combination 71, 72, 73 remains non-conductive (and the SCR 70 remains untriggered) even though the positive back e.m.f. tends (except for the presence of Zener 71) to forwardly bias the diode 72. Thus negative torque due to back e.m.f. is wholly avoided.

The flyback circuit operation described above manifestly applies equally well to the identical flyback circuits shown in FIG. 6 for the windings B and C.

It was noted earlier that the normally non-conductive circuit element, here shown preferably as an SCR 70, need not necessarily be able to conduct current only in one direction when it is triggered into its conductive state. This becomes apparent when one realizes that the element is set to its conductive state only when the voltage $V_a$ is of flyback polarity, i.e., of a polarity which can drive current in the direction of the arrows labeled on the path 95 in FIG. 8. Yet, because the current can only flow around the path 95 in the direction of the arrows, the one way anode-cathode conduction characteristic of the SCR 70 poses no problem or disadvantage. The SCR 70 is, moreover, representative of a class of electrical devices which are normally non-conductive as a result of a voltage of either polarity applied thereacross, which become conductive when triggered or set, but which revert to a non-conductive state automatically as a consequence of current falling to a predetermined low value (specifically, a value of zero in the case of an SCR). In general, that class of devices may be denominated as "triggered, self cut-off" devices, here called "TSCO devices" for a short name. The class is exemplified by SCR's, TRIAC's and thyratrons. Although it is not essential for the practice of the invention in its broader aspects to utilize a TSCO device as the normally non-conductive element in the first flyback path means, a TSCO device is preferred because it includes and constitutes—without added expense or connections—a means for restoring the element to a non-conductive state when the current therethrough falls to a predetermined low value (e.g., zero). If, however, a TSCO device is not employed, a physically separate means to serve the restoring function may be provided.

Figure 10:
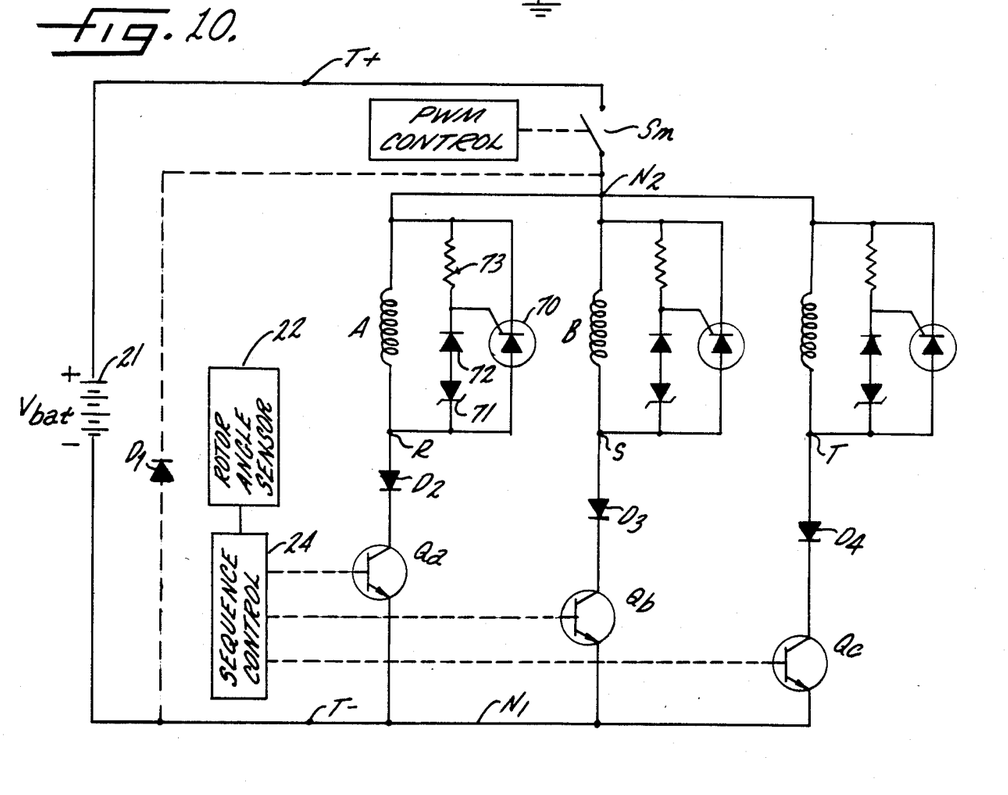
FIG. 10 is a schematic circuit diagram of a motor control circuit utilizig both aspects of the present invention.

The highly advantageous flyback circuitry of FIG. 6 may be employed in a novel combination with a motor control circuit which permits variation of motor torque and speed by pulse width modulation of a master series switch as described earlier with reference to FIGS., 2–5. Such a combination is shown in FIG. 10 wherein a plurality of windings A, B, C are respectively connected in series legs with power switches $Q_a$, $Q_b$, $Q_c$ controlled by a sequencer 24 activated by a rotor angle sensor 22. The series legs are connected in a parallel array to create nodes N1, N2 and a master switch $S_m$, actuated by a PWM control 50, is connected in series with the parallel array between first and second terminals T+, T− adapted for connection to a d.c. voltage source 21. In this arrangement, each of the windings has associated with it a flyback accommodating circuit like that of FIGS. 6 and 8—including a normally non-conductive SCR 70 with means in the preferred form of a Zener diode 71, a diode 72 and a resistor 73 for triggering the SCR when the voltage across the winding (i) is of a polarity corresponding to flyback action and (ii) exceeds a predetermined threshold magnitude which preferably is only slightly greater than the highest back e.m.f. value.

In FIG. 10, therefore, the SCR for each winding is triggered to carry flyback current when flyback action arises both because the main switch $S_m$ opens after both the main switch and the sequence switch have been closed [case (a)], and because the sequence switch opens after the main switch and the sequence switch have been closed [case (b)]. All of the advantages noted above—including avoidance of negative torque and return of flyback energy to useful motor output—are obtained in both cases. The flyback circuitry operates in the manner described with respect to FIGS. 6–9, but collectively the three flyback circuits now operate essentially with the frequency at which the main switch is actuated.

Further, the flyback circuitry as thus far described relative to FIG. 10 accommodates case (c) defined above. If winding A still contains flyback energy at an instant when both the switches $S_m$ and $S_a$ open, the SCR 70 will have been triggered when the first of such switches opened—and it will continue to carry flyback current without any effect due to the opening of the second switch.

It will be apparent that in FIG. 10 when switch $Q_a$ is closed but switch $S_m$ has just opened so that flyback voltage is induced in winding A, there is a very short time interval (see 91a in FIG. 9) when the voltage $V_a$ is equal to the threshold value of the Zener diode 71. During that short time, the open circuit voltage exerted on the switch $S_m$ is equal to $V_{bat}+V_{dz}$—so the switch should be rated to withstand at least that magnitude of open circuit voltage. On the other hand, when switches $S_m$ and $Q_a$ have been closed but then switch $Q_a$ opens, the open circuit voltage across switch $Q_a$—during the aforesaid short interval—is equal to $V_{bat}+V_{dz}-V_{sm}$, where $V_{sm}$ is the forward, very low and thus negligible voltage drop across the conductive switch $S_m$. Thus, open circuit rating for switches $Q_{a-c}$ should be about the same as that for the main switch $S_m$. These are reasonable open circuit voltages which make it possible to utilize relatively inexpensive switching devices or transistors.

It may be desired or preferred in some applications, however, to accommodate case (a) flyback by adding to the apparatus of FIG. 10 a diode D1 connected between nodes N1 and N2, i.e., connected across the parallel array. This is indicated by dashed line conductors in FIG. 10. The diode D1, if present, is connected and operates as described with reference to FIG. 2—and it carries flyback current from, and back to, each of the windings A, B and C when that winding's sequence switch is closed but the main switch $S_m$ opens. In these circumstances, the case (a) open circuit voltage across the main switch $S_m$ is limited to the sum of $V_{bat}+V_{d1}$, where $V_{d1}$ is the relatively small (about 0.7 volts) forward drop across the diode D1. Thus, the switch $S_m$ need be rated for an open circuit voltage of $V_{bat}+V_{d1}$ which is materially less than the value of $V_{bat}+V_{dz}$ applicable when the diode D1 is not employed. By using the diode D1, therefore, the main switch $S_m$ need be rated to withstand a somewhat lower open circuit voltage, and its cost may be less. If the diode D1 is used in the FIG. 10 embodiment, then the series leg diodes D2, D3 and D4 are preferably also included for the purpose of avoiding positive biasing of the collector-base junctions in the transistors $Q_a$, $Q_b$, $Q_c$ as explained above.

We claim:

1. In a d.c. motor having a magnetic field multipole rotor and plurality of stator phase windings with switching means to sequentially connect the windings to a d.c. voltage source as the rotor turns through successive angular regions, a flyback circuit associated with at least one of said windings and comprising, in combination
   (a) means constituting a normally non-conductive current flow path in parallel with the winding, said means including an element which, when enabled, makes said path conductive with substantially negligible opposition to current flow,
   (b) means responsive to the voltage across said winding for setting said element into an enabled state when said voltage (i) is of the polarity created by inductive flyback action and (ii) exceeds a predetermined threshold magnitude, and
   (c) means for restoring said element to its disabled state, after it has been enabled, when current flow therethrough falls essentially to a predetermined low value.

2. The combination set out in claim 1 further characterized in that said predetermined low value is zero.

3. The combination set out in claim 1 further characterized in that said predetermined threshold magnitude is greater than the largest amplitude of back e.m.f. induced in the winding during operation of the motor within the range of speeds for which it is designed and specified.

4. The combination set out in claim 1 further characterized in that said means (b) includes a sensing circuit connected across the winding to sense the winding voltage, said sensing circuit including, in series,
   (1) a unidirectionally conductive device poled to prevent sensing circuit current when the winding voltage is of a polarity opposite to that created by inductive flyback,
   (2) means creating a bias voltage which opposes forward current flow through said unidirectionally conductive device, and
   (3) means responsive to current flow through said device (1) and said means (2) for producing a signal which sets said element into an enabled state.

5. The combination defined by claim 4 wherein said unidirectionally conductive device (1) is a diode, said means (2) is a Zener diode poled oppositely to said diode, and said means (3) is a circuit element which produces a voltage drop thereacross as a result of current flow therethrough, said voltage drop constituting said signal.

6. The combination set forth in claim 1 further characterized in that said element is a normally non-conductive electrical device capable of being triggered into an enabled, conductive state in response to a momentary triggering pulse and which reverts automatically to a disabled, non-conductive state when current flow therethrough falls essentially to zero; said element thereby including and constituting said means (c).

7. The combination set forth in claim 6 further characterized in that said element is a silicon controlled rectifier (SCR).

8. The combination set forth in claim 1 further characterized in that said means (a) is a TSCO device, said means (b) is a series combination of a diode, a Zener diode, and a resistance connected across the winding, with a coupling from said resistance to trigger said TSCO, and said means (c) is constituted by said TSCO device.

9. The combination set forth in claim 8 wherein said TSCO device is an SCR.

10. A flyback accommodating circuit for use in association with a stator winding of a d.c. motor having a multiple magnetic field rotor and a plurality of stator windings, each stator winding having switch means for periodically applying thereto a d.c. source voltage, said flyback circuit comprising, in combination (a) a normally disabled, non-conductive element connected across the winding, said element when enabled being conductive with substantially negligible opposition to current flow, (b) means responsive to the voltage across the winding for setting said element into an enabled state when such voltage (i) is of the polarity created by inductive flyback action and (ii) exceeds a predetermined threshold magnitude, and (c) means for restoring said element to its disabled state, after it has been enabled, when current flow therethrough falls essentially to a predetermined low value.

11. The combination set out in claim 10 further characterized in that said predetermined low value is zero.

12. The combination set out in claim 10 further characterized in that said predetermined threshold magnitude is greater than the largest amplitude of back e.m.f. induced in the winding during operation of the motor within the range of speeds for which it is designed and specified.

13. The combination set out in claim 10 further characterized in that said means (b) includes a sensing circuit connected across the winding to sense the winding voltage, said sensing circuit including in series (1) a unidirectionally conductive device poled to prevent sensing circuit current when the winding voltage is of a polarity opposite to that created by inductive flyback, (2) means creating a bias voltage which opposes forward current flow through said unidirectionally conductive device, and (3) means responsive to current flow through said device (1) and said means (2) for producing a signal which sets said element into an enabled state.

14. The combination defined by claim 13 wherein said unidirectionally conductive device (1) is a diode, said means (2) is a Zener diode poled oppositely to said diode, and said means (3) is a circuit element which produces a voltage drop thereacross as a result of current flow therethrough, said voltage drop constituting said signal.

15. The combination set forth claim 10 further characterized in that said element is a normally non-conductive electrical device capable of being triggered into an enabled, conductive state in response to a momentary triggering pulse and which reverts automatically to a disabled, non-conductive state when current flow therethrough falls essentially to zero; said element thereby including and constituting said means (c).

16. The combination set forth in claim 15 further characterized in that said element is a silicon controlled rectifier (SCR).

17. The combination set forth in claim 10 further characterized in that said element (a) is a TSCO device, said means (b) is a series combination of a diode, a Zener diode, and a resistance connected across the winding, with a coupling from said resistance to trigger said TSCO, and said means (c) is constituted by said TSCO device.

18. The combination set forth in claim 17 wherein said TSCO device is an SCR.

19. In a d.c. motor having a permanent magnetic field rotor and a plurality of stator windings, with switch means for connecting said windings in sequence to a d.c. source voltage as the rotor turns through successive angular regions, the improvement in flyback accommodation which comprises, in association with each given winding (a) a TSCO device connected in parallel with the given winding, (b) a sensing circuit connected across the given winding to sense the winding voltage, said sensing circuit including in series (1) a unidirectionally conductive device poled to prevent sensing circuit current when the winding voltage is of a polarity opposite to that created by inductive flyback, (2) means creating a bias voltage which opposes forward current flow through said unidirectionally conductive device, and (3) means responsive to current flow through said unidirectionally conductive device (1) and said means (2) for producing and applying a triggering signal to said TSCO device when the voltage across the given winding (i) is of the polarity created by flyback action and (ii) exceeds in magnitude said bias voltage.

20. The improvement defined in claim 19 further characterized in that said means (2) creates a bias voltage which is at least greater in magnitude that the peak amplitude of the back e.m.f. induced in the given winding during normal usage of the motor within the intended range of operating speeds.

21. The improvement defined in claim 19 wherein said TSCO device is an SCR.

22. The improvement defined in claim 19 wherein said means (2) is a Zener diode.

23. The improvement defined in claim 19 wherein said means (3) is a resistance.

24. In a control circuit for a d.c. motor having a multipole magnetic field rotor and a plurality of stator phase windings, the combination comprising
   (a) a plurality of power switches, each respectively in series with one of said phase windings to form a series leg,
   (b) a main switch,
   (c) means connecting said series legs in a parallel array, and the parallel array in series with said main switch between first and second terminals adapted for connection to a d.c. voltage source,
   (d) control means for closing said power switches in staggered sequence as the rotor turns through successive angular regions,
   (e) control means for closing and opening said main switch with a selected duty cycle and at a frequency which is greater than the frequency at which said power switches are closed, and
   (f) a plurality of flyback accommodating circuits each respectively associated with one of said windings, each of said flyback circuits including
      (f1) means constituting a normally non-conductive current flow path in parallel with the winding, said means including an element which, when enabled, makes said path conductive with substantially negligible opposition to current flow,
      (f2) means responsive to voltage across said winding for setting said element into an enabled state when such voltage (i) is of the polarity created by inductive flyback action and (ii) exceeds a predetermined threshold magnitude, and
      (f3) means for restoring said element to its disabled state, after it has been enabled, when current flow therethrough falls essentially to a predetermined low value
whereby said element carries flyback current and returns energy to the winding after current flow through the winding from the d.c. voltage source is interrupted by the opening of either the main switch or the associated power switch.

25. The combination set forth in claim 24 further characterized by and including a diode connected across said parallel array and poled to conduct flyback current through any of said windings when curent flow through a given winding from the d.c. voltage source is interrupted by the opening of the main switch, said element thus conducting flyback current when interruption occurs due to opening of the power switch associated with the given winding.

26. The combination set out in claim 24 further characterized in that said predetermined low value is zero.

27. The combination set out in claim 24 characterized in that said predetermined threshold magnitude for said means (f2) is greater than the largest amplitude of back e.m.f. induced in said winding during operation of the motor within the range of speeds for which it is designed and specified.

28. The combination set out in claim 24 further characterized in that said means (f2) includes a sensing circuit connected across the winding to sense the winding voltage, said sensing circuit including, in series,
   (1) a unidirectionally conductive device poled to prevent sensing circuit current when the winding voltage is of a polarity opposite to that created by inductive flyback,
   (2) means creating a bias voltage which opposes forward current flow through said unidirectionally conductive device, and
   (3) means responsive to current flow through said device (1) and said means (2) for producing a signal which sets said element into an enabled state.

29. The combination defined by claim 28 wherein said unidirectionally conductive device (1) is a diode,
   said means (2) is a Zener diode poled oppositely to said diode, and
   said means (3) is a circuit element which produces a voltage drop thereacross as a result of current flow therethrough, said voltage drop constituting said signal.

30. The combination set forth in claim 24 further characterized in that said element is a normally non-conductive electrical device capable of being triggered into an enabled, conductive state in response to a momentary triggering pulse and which reverts automatically to a disabled, non-conductive state when current flow therethrough falls essentially to zero; said element thereby including and constituting said means (f3).

31. The combination set forth in claim 30 further characterized in that said element is a silicon controlled rectifier (SCR).

32. The combination set forth in claim 24 further characterized in that
   said means (f1) is a TSCO device,
   said means (f2) is a series combination of a diode, a Zener diode, and a resistance connected across the winding, with a coupling from said resistance to trigger said TSCO, and
   said means (f3) is constituted by said TSCO device.

33. The combination set forth in claim 32 wherein said TSCO device is an SCR.

* * * * *